United States Patent
Magahern et al.

(10) Patent No.: US 9,571,558 B2
(45) Date of Patent: Feb. 14, 2017

(54) GENERATING A DYNAMIC USER INTERFACE REPRESENTING AN ARBITRARY CONTENT PROVIDER BACK-END

(71) Applicant: Apple Inc., Cupertino, CA (US)

(72) Inventors: Charles Magahern, San Francisco, CA (US); Edward T. Schmidt, Burlingame, CA (US); Jason P. Ketterman, Mountain View, CA (US); Nicholas J. Paulson, San Francisco, CA (US); Thomas Alsina, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 14/225,004

(22) Filed: Mar. 25, 2014

(65) Prior Publication Data

US 2015/0248218 A1    Sep. 3, 2015

Related U.S. Application Data

(60) Provisional application No. 61/947,283, filed on Mar. 3, 2014.

(51) Int. Cl.
*G06F 13/00* (2006.01)
*G06F 15/00* (2006.01)
*H04L 29/08* (2006.01)
*G06F 9/44* (2006.01)

(52) U.S. Cl.
CPC ......... *H04L 67/025* (2013.01); *G06F 9/4443* (2013.01)

(58) Field of Classification Search
CPC .................................................. G06F 17/3002
USPC ................. 715/716, 772, 780, 786, 761–765
See application file for complete search history.

(56) References Cited

U.S. PATENT DOCUMENTS

| | | |
|---|---|---|
| 7,810,036 B2 | 10/2010 | Bales et al. |
| 8,160,495 B2 | 4/2012 | Khedouri et al. |
| 8,631,456 B2 | 1/2014 | Reisman |
| 8,640,183 B2 | 1/2014 | Reisman |
| 2007/0118606 A1* | 5/2007 | Duncan ............... G06F 17/3002 709/217 |
| 2010/0131983 A1 | 5/2010 | Shannon et al. |
| 2014/0280580 A1* | 9/2014 | Langlois ............... H04W 4/005 709/204 |

* cited by examiner

*Primary Examiner* — Kevin Nguyen
(74) *Attorney, Agent, or Firm* — Polsinelli LLP

(57) ABSTRACT

Third-party apps on a mobile device can expose their content, such as audio content, video content, music stations, audio books, and so forth, to an in-vehicle computing device via a standardized format for content items that is decoupled from the user interfaces of the third-party apps. In this way, the in-vehicle computing device can display the content items in an in-vehicle user interface without granting providers of the content items access to the in-vehicle user interface. This system can present the content items in a different, independent user interface, even though the content items are associated with a third-party app having its own user interface. Content items encapsulate metadata describing the media, such as a title, subtitle, artwork, playback progress, a content item type, whether the content item is playable, whether the content item is a container item, and so forth.

21 Claims, 5 Drawing Sheets

GENERATING A DYNAMIC USER INTERFACE REPRESENTING AN ARBITRARY CONTENT PROVIDER BACK-END

RELATED APPLICATIONS

This application claims priority to U.S. Provisional Application No. 61/947,283, filed 3 Mar. 2014, the entire contents of which are herein incorporated by reference in their entirety.

BACKGROUND

1. Technical Field

The present disclosure relates to dynamic user interfaces and more specifically to adapting a user interface for a specific environment using content items provided by a back-end independent of formatting of the content items or a structure of the back-end.

2. Introduction

With the proliferation of personal computing devices and the advancement of their capabilities, many users expect similar functionality in different environments, such as an electronic car control system. Many of these systems are difficult to navigate or extremely limited in their capabilities. Existing approaches to car interfaces fail to expose content in an appealing or safe way, or fail to expose or provide adequate access to resources users desire. Further, users desire access to many different types and sources of content, which are often stored in multiple different file types, formats, or are accessible via different application programming interfaces (APIs).

For example, a user of a smartphone may wish to access different types of content available through the smartphone, but while driving. The user interface of the phone, as well as the user interface of the various mobile apps on the phone which provide access to the different content vary widely. Different sources and types of content items can also vary widely. The array of different types of content sources and user interfaces are all distractions from operating a vehicle, but can also be confusing to many users even outside of the scenario of driving.

DETAILED DESCRIPTION

Figure 1:
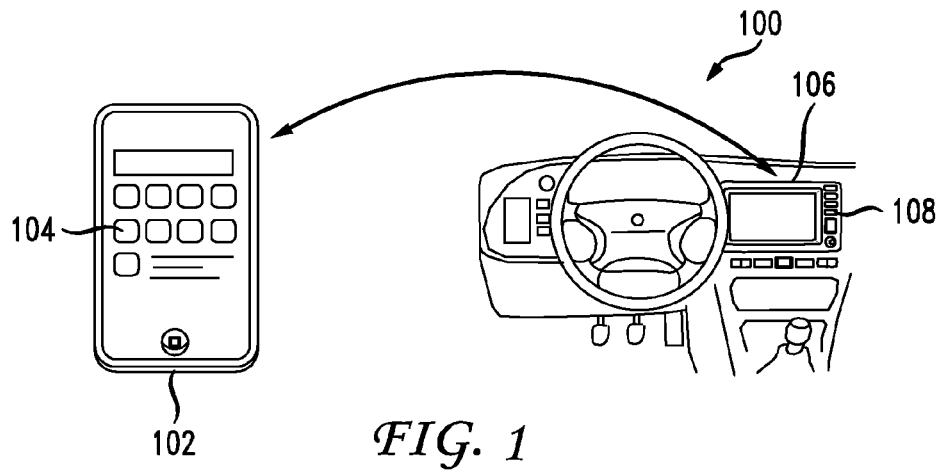
FIG. 1 illustrates an example system configuration.

Disclosed herein are systems and methods for separating a user interface from content items, such as separating a car-based user interface from content items provided or exposed via various mobile applications. In this example, a mobile device such as a smartphone or tablet computing device connects via a wired or wireless connection to an on-board computer integrated as part of a vehicle. Then, the mobile device drives the user interface of the on-board computer. The mobile device can completely replace the user interface, or can provide instructions for modifying or adapting an existing user interface of the on-board computer. The user can then control the user interface of the on-board computer via existing in-vehicle controls, such as in-vehicle buttons or voice commands, or via input provided to the mobile device via on-screen buttons, text input, a speech interface, and so forth.

Mobile applications executing on or via the mobile device can expose various content items to the mobile device for use via the user interface on the on-board computer. Each different mobile application can provide access to content items available via the mobile applications in a standardized way, even though the content items represent different types or categories of content. Further, the mobile device can control or provide the on-board user interface in a manner that is consistent with the look and feel and functionality of the mobile device. The mobile device can present a user interface via the on-board computer that still substantially differs from the user interface on the mobile device in that the on-board computer user interface is designed to be simpler or to distract users less than using the 'full' mobile user interface. Mobile applications can expose a complete or partial subset of all available content items for various reasons such as licensing, capabilities of the on-board computer user interface, user preferences, user permissions, or other reasons. The subset of available content items can change dynamically based on whether the mobile device has sufficient cellular network reception, based on what type of cellular network is available, or whether a network connection is available.

Mobile applications provide access to various content items, some of which are playable and some of which are non-playable. Content items can be stored or related with one another in a hierarchy. The mobile applications provide access to the content items in a generic form describing the main content item and a collection of properties. For example, an audio content item can include a main content item of a specific audio file, whereas the collection of properties can include title, subtitle, artwork, playback progress (content state), isItemPlayable, isContainer, album, genre, purchase date, comments, "favorite" status, user annotations, links, lyrics, and so forth. Other types of content items, such as a television show or a movie, can include different properties, such as original air date, producer, television network or movie studio, actors, a link to a corresponding IMDB page, and so forth. Some of the properties are shared between different content item types, such as playback progress (content state) which can apply to both audio and video content items. Other types of content items can include points of interest on a map, books, games, images, email messages, voicemails, biometric data, or virtually any other digital media content accessible via a mobile device. Some content items are containers of other content items, such as a playlist or a listing of episodes in a season of a television show. Content items can be stored or accessed via a content item hierarchy. A root content item can provide an initial access point for other content items in the hierarchy. The hierarchy can be definite or indefinite. For example, a content item hierarchy of an on-device playlist for a mobile device is known and definite, whereas a content item hierarchy for a streaming or cloud-based service such as Spotify can grow and be exposed dynamically, as the user browses the hierarchy.

The mobile device or the on-board computer can control the user interface on the on-board computer to present content items in different car-friendly views based on the content item type, and can adapt dynamically as the type of content items presented changes. For, example, the on-board computer can present content items in a playlist view, a view of top content items, in a table view, or in some other view dictated by the on-board computer, a user interface control algorithm, the mobile device, or a mobile application on the mobile device. For example, if the content item is a container content item, the on-board user interface can show that child items are available to open to explore another part of the hierarchy, such as a list of child content items. The on-board user interface can allow the user to access and play content items in a random-access way.

Various embodiments of the disclosure are described in detail below. While specific implementations are described, it should be understood that this is done for illustration purposes only. Other components and configurations may be used without parting from the spirit and scope of the disclosure.

These approaches allow third party applications on the mobile device to expose their content items, such as podcasts, Pandora stations, audio books, etc., to the on-board computer to display the content items in the user interface of the on-board computer without giving the content providers or the third party applications access to or control over the user interface. In one embodiment, the system only provides limited control over the user interface to content providers or third party applications, such as allowing them control over a region of the display designated for advertisement or branding data or images.

Content items can be an encapsulation of metadata describing a piece of media. Each Content item can include, for example, a title, an album title, subtitles, artist names, artwork, playback progress indicator to allow the system to update the user interface, a content item type such as an album, playlist, song, movie, etc., an isPlayable flag indicating whether the system can begin playback using this content item (a list of stations may not be playable, but a song playlist may be, for example). Content items can include a unique identifier that is universally unique, or that is unique for the particular mobile application from which the content item originates. For example, each content item can be uniquely identified by a combination of a mobile application identifier plus a content item identifier. The system can allow a user to search for or discover content items based on the identifiers.

The system can display content items from a content provider as a tree of content items. The system does not need to have the entire tree to display the user interface. Instead, the system can retrieve components of the tree as needed. For example, if the system is displaying a content item X representing a playlist, the system can retrieve the corresponding children of content item X when the user requests to display the songs in the playlist or to begin playback of the songs in the playlist. The system can retrieve and present these children content items upon request, or can cache them some time after retrieving the playlist represented in content item X.

While many of the examples provided herein are discussed in terms of a mobile device and a user interface of an on-board computer, the same principles can be applied to virtually any other set of two or more devices with different user interfaces, at least one of which has applications that expose content items for use in a non-native user interface. In one example, the on-board computer can display content items that are typically accessible only via a text-based user interface or a voice interface.

FIG. 1 illustrates an example system configuration 100 of a mobile device 102 and an on-board computer 106. The mobile device 102 has a native user interface 104 as well as a set of mobile applications, sometimes known as apps. Each of the mobile applications can have its own user interface which may share some or all of the user interface elements of the user interface of the mobile device generally, although some mobile applications have their own unique user interfaces. The mobile device 102 is communicably coupled with the on-board computer 106, which has its own user interface 108. The mobile device 102 can be communicably coupled with the on-board computer 106 via a wired or wireless data connection.

Figure 2A:
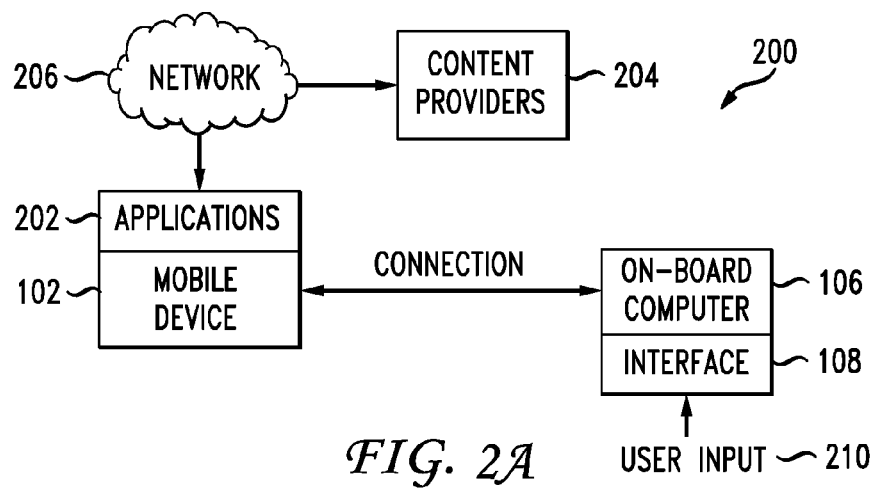
FIG. 2A illustrates an example communication path between a mobile device and an on-board computer.
Figure 2B:
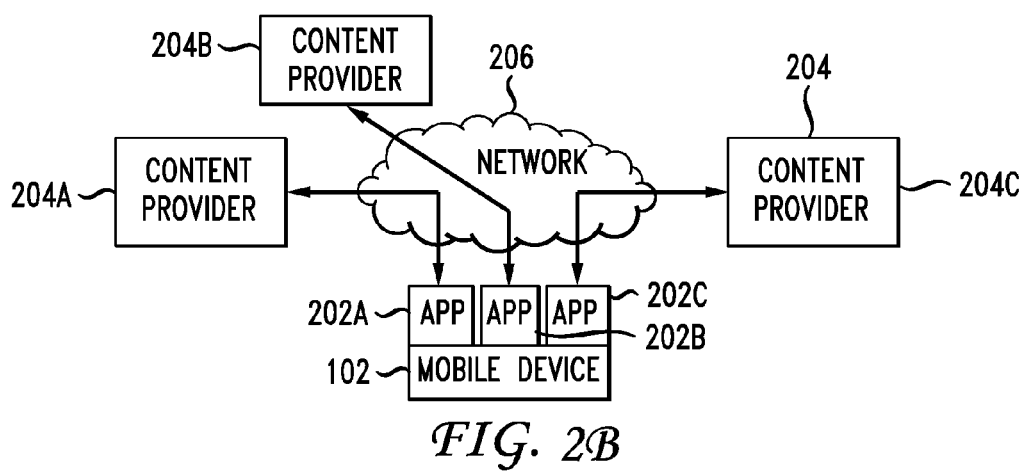
FIG. 2B illustrates an example mobile device interfacing with multiple content providers via associated mobile apps.

FIG. 2A illustrates an example communication path between the mobile device 102 and the on-board computer 106. Mobile applications 202 executing wholly or partially on the mobile device 102 can retrieve and use content items provided from content providers 204 via a network 206 such as a Wi-Fi or cellular data network. The mobile device 102 can communicate with the on-board computer 106 via a wired or wireless connection 208, such that the mobile device 102 can control or drive the user interface 108 presented on the on-board computer 106 to a user. A user can request, browse, play, select, or otherwise manipulate content items via the user interface 108 of the on-board computer 106. The content items are presented on the user interface 108 in a context independent of their 'native' user interface in their corresponding mobile applications 202 on the mobile device 102. The mobile device 102 and/or the on-board computer 106 can access content items through the mobile applications 202 via a standardized content items access interface. Alternatively, the mobile device 102 and/or the on-board computer 106 can access content items via the standardized content items access interface directly from the content providers 204, bypassing the mobile applications' user interfaces. In this way, the user interface 108 of the on-board computer 106 can provide access to content items in a manner suited to a specific use-case scenario, such as an in-vehicle entertainment system, while presenting a completely different and independent user interface from the mobile applications 202 that typically provide access to the content items. FIG. 2B illustrates an example mobile device 102 interfacing with multiple content providers 204A, 204B, 204C via associated mobile applications 202A, 202B, 202C. This example illustrates that the system can access content items from multiple disparate content providers 204A, 204B, 204C. Further, the various mobile applications 202A, 202B, 202C can each have their own unique interfaces for presenting content items. But the mobile applications 202A, 202B, 202C expose their associated content items to the mobile device 102 not only through the application-specific user interfaces, but also via a standardized data interface, so that the mobile device 102 may or may not know details of where the content items originate.

Figure 3A:
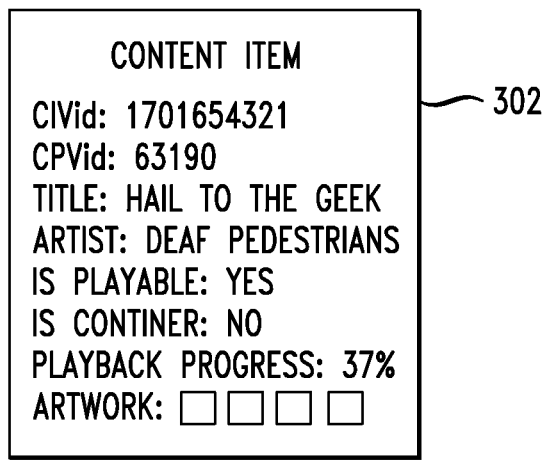
FIG. 3A illustrates an example structure of a content item.

FIG. 3A illustrates an example structure of a content item 302 in an example standardized data interface. This example content item 302 shows a content item unique identifier, a content provider unique identifier, a title, an artist, an isPlayable field, an isContainer field, a PlaybackProgress field, and album artwork. Other fields not shown can include a mobile application unique identifier, a license key, lyrics, links to associated content items, a parent content item in a hierarchy, a child content item in a hierarchy, a price, a reporting mechanism for reporting instances of playback, and a synchronization mechanism for synchronizing playback or changes to the content item to the associated mobile application. The PlaybackProgress field can track progress as a percentage, as shown in FIG. 3A, or based on some other measuring scheme, such as a playback time or a last-played scene or chapter.

Figure 3B:
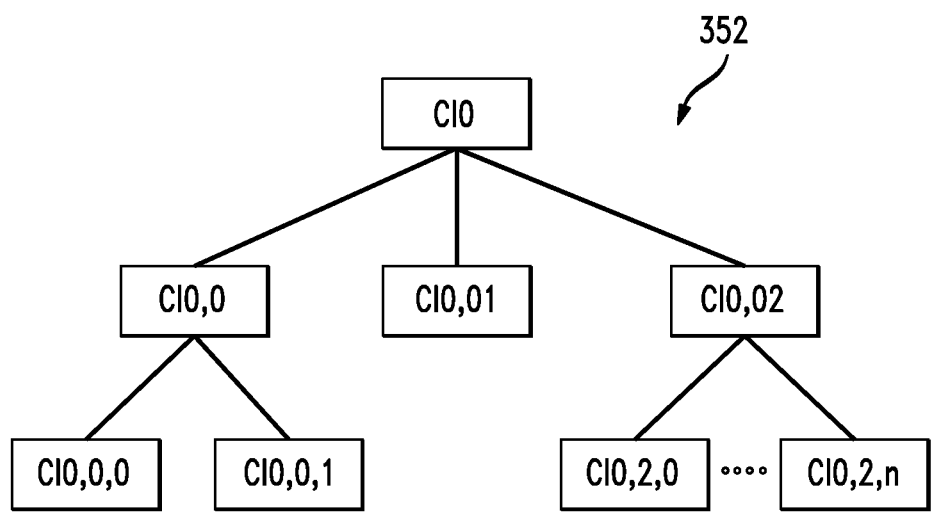
FIG. 3B illustrates an example randomly addressable hierarchy of content items.

FIG. 3B illustrates an example randomly accessible hierarchy 352 of addressable content items. The content items can be addressed in the hierarchy 352 based on their position in the hierarchy, so the root content item is content item (0), labeled as CIO. If the root content item has three children content items, they are addressed as items (0,0), (0,1), and (0,2). If item (0,0) has two children, they are addressed as items (0,0,0) and (0,0,1). If item (0,2) has n children, the children are addressed as items (0,2,0) . . . (0,2,n−1). The root content item can be associated with a specific mobile application or content provider, in which case the entire hierarchy or items within the hierarchy can be further addressable by the unique identifier of the associated mobile application or content provider. For example, the unique identifier of the mobile application can be prepended or appended to the hierarchy address. The mobile application or the content provider can provide the structure of the hierarchy or can provide multiple hierarchies with one or more overlapping sets of content items. For example, Spotify can provide a hierarchy organizing songs into genres, then artists, then songs. Spotify could also provide an alphabetical hierarchy of songs by artist or by album. The same content items can be arranged in a virtually limitless set of different hierarchies. The user interface 108 of the on-board computer 106 can adapt based on received hierarchy information and content items. Thus, the user interface 108 is based on the content items and their organization and is completely decoupled from the user interface of the mobile device 102 or the application 202 providing access to the content items.

Figure 6:
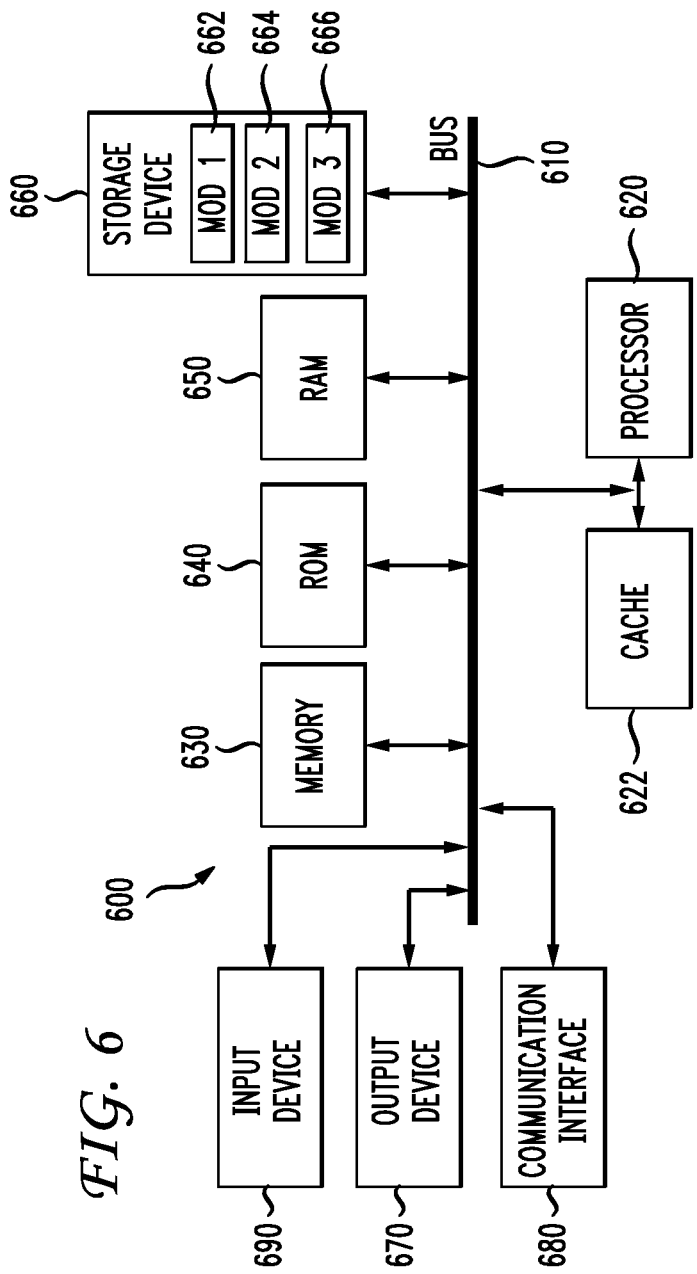
FIG. 6 illustrates an example system embodiment.

Having disclosed some basic system components and concepts, the disclosure now turns to the exemplary method embodiment. For the sake of clarity, the method is described in terms of an exemplary system 600 as shown in FIG. 6 configured to practice the respective method. The steps outlined herein are exemplary and can be implemented in any combination thereof, including combinations that exclude, reorder, add, or modify certain steps.

Figure 4:
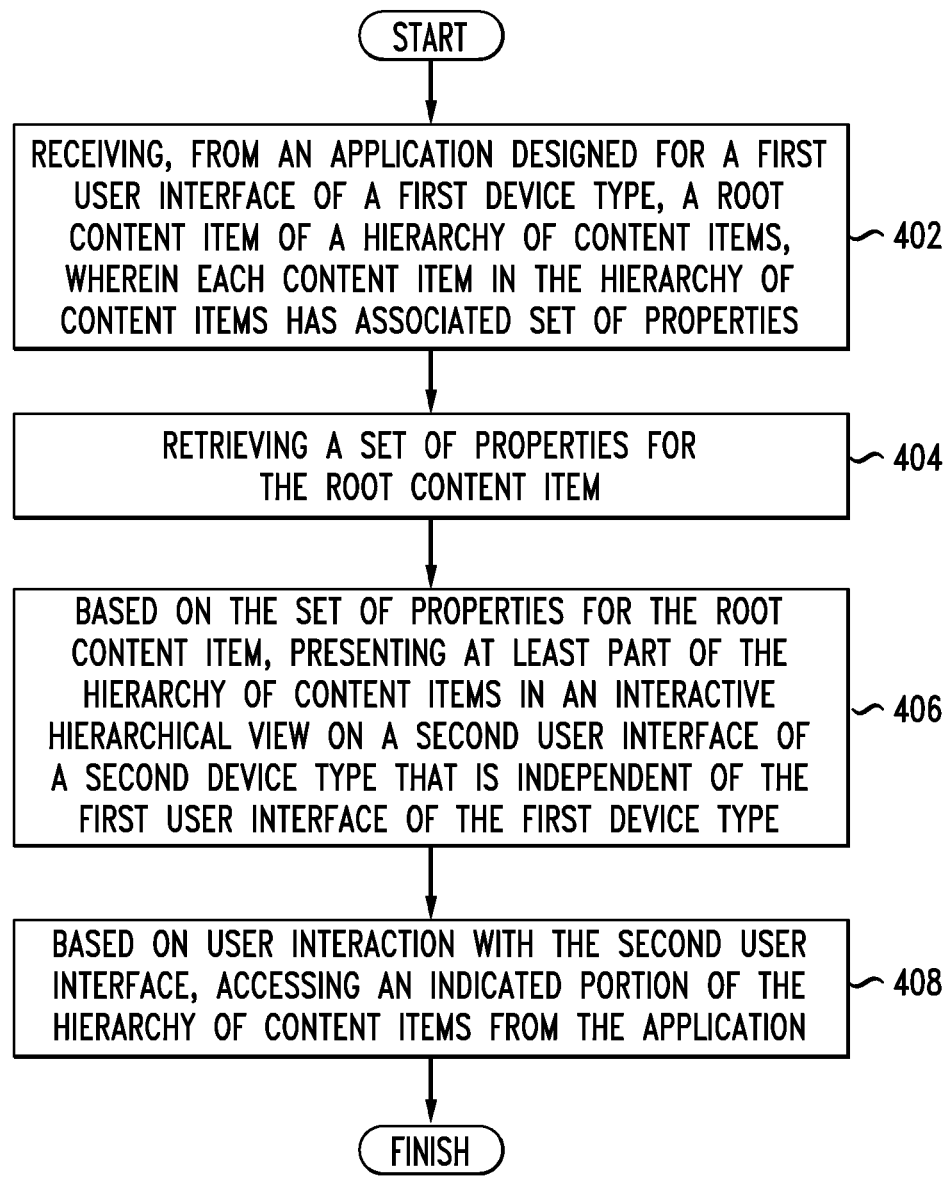
FIG. 4 illustrates a first example method embodiment for accessing content items via a user interface non-native to the content items.

FIG. 4 illustrates a first example method embodiment for accessing content items via a user interface non-native to the content items. The system can receive, from an application designed for a first user interface of a first device type, a root content item of a hierarchy of content items, wherein each content item in the hierarchy of content items has associated set of properties (402). The first device type can be a mobile device, and the second device type can be an in-vehicle display. The first and second device types can be virtually any pair of devices with different user interface types, in which the first device can expose content items for use with the user interface of the second device. At least part of the hierarchy of content items may or may not be known, but can be available from the first device upon request from the second device or from a user. The second user interface can provide a uniform graphical front-end for any hierarchy of content items independent of the application.

The system can retrieve a set of properties for the root content item (404). The set of properties can include a title, a subtitle, an author, an artist, artwork, playback progress, whether a content item is a container, or whether the content item is playable. Based on the set of properties for the root content item, the system can present at least part of the hierarchy of content items in an interactive hierarchical view on a second user interface of a second device type that is independent of the first user interface of the first device type.

Based on user interaction with the second user interface, the system can access an indicated portion of the hierarchy of content items from the application (406). The system can access the indicated portion by retrieving a content item for playback. The user interaction with the second user interface can provide random access to the hierarchy of content items, or can provide random access for playback of a content item. The system can access the indicated portion of the hierarchy of content items by retrieving the indicated portion from a remote server, such as a network based media server (408). The application can be a third-party application, and the root content item and the hierarchy of content items are accessible via an application programming interface (API). The application can be running on a first device of the first device type which communicates with a second device of the second device type via the API. The API may be different from a "native" API for accessing the content items via the application. Each of the application can be assigned a unique application identifier. Each content item in the hierarchy can be assigned a unique content item identifier. Then, the system can index the content items in the hierarchy based on the unique application identifiers and the unique content item identifiers.

Figure 5:
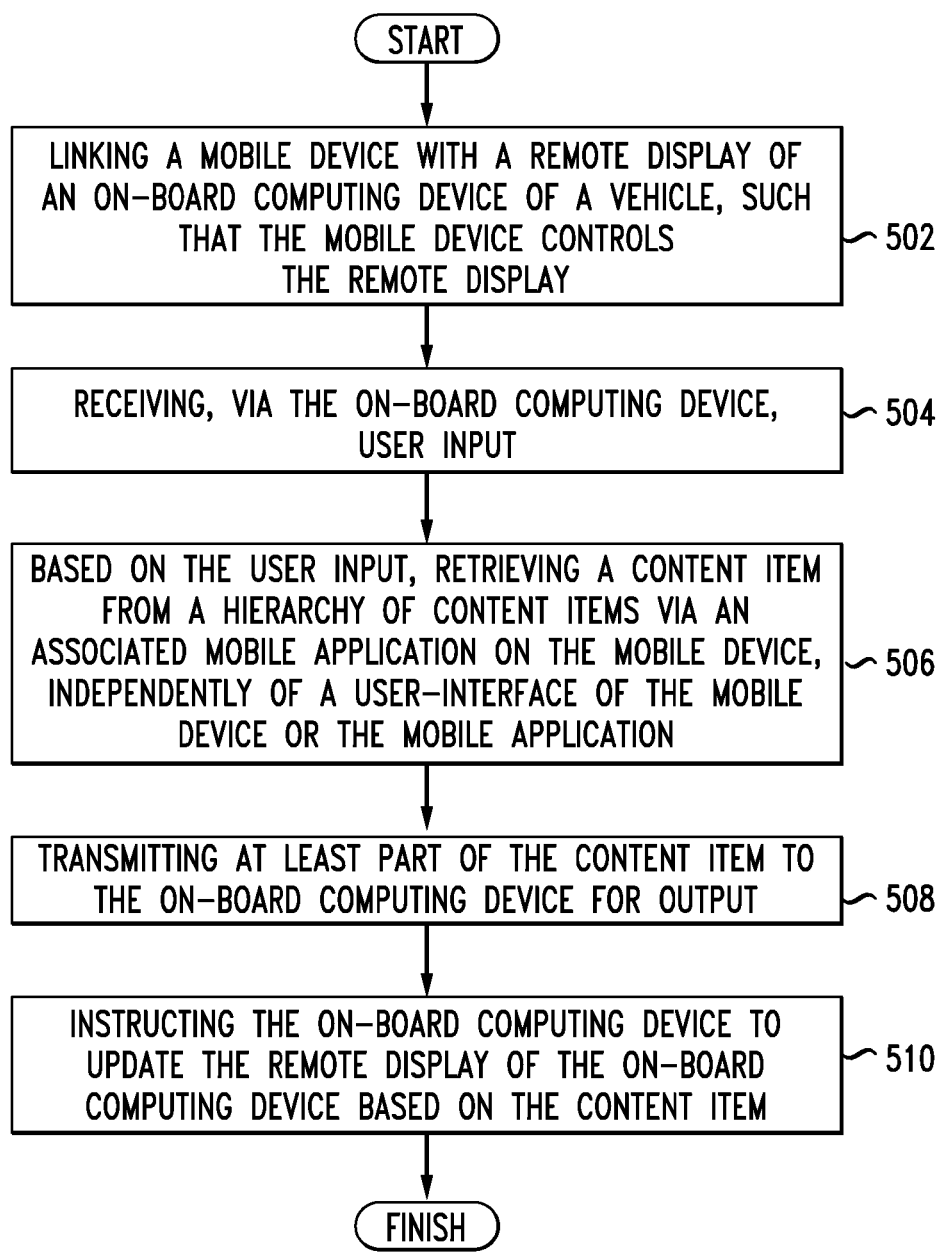
FIG. 5 illustrates a second example method embodiment for providing content items to an on-board computing device of a vehicle via a mobile device.

FIG. 5 illustrates a second example method embodiment for providing content items to an on-board computing device of a vehicle via a mobile device. The mobile device can link with a remote display of an on-board computing device of a vehicle, such that the mobile device controls the remote display (502), and the mobile device can receive, via the on-board computing device, user input (504). Then, based on the user input, the mobile device can retrieve a content item from a hierarchy of content items via an associated mobile application on the mobile device, independently of a user-interface of the mobile device or the mobile application (506). The mobile device can transmit at least part of the content item to the on-board computing device for output (508), and instruct the on-board computing device to update the remote display of the on-board computing device based on the content item (510).

A brief description of a basic general purpose system or computing device in FIG. 6 which can be employed to practice the concepts, methods, and techniques is disclosed below. With reference to FIG. 6, an exemplary system and/or computing device 600 includes a processing unit (CPU or processor) 620 and a system bus 610 that couples various system components including the system memory 630 such as read only memory (ROM) 640 and random access memory (RAM) 650 to the processor 620. The system 600 can include a cache 622 of high-speed memory connected directly with, in close proximity to, or integrated as part of the processor 620. The system 600 copies data from the memory 630 and/or the storage device 660 to the cache 622 for quick access by the processor 620. In this way, the cache provides a performance boost that avoids processor 620 delays while waiting for data. These and other modules can control or be configured to control the processor 620 to perform various operations or actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the processor. The processor 620 may be a self-contained computing system, containing multiple cores or processors, a bus, memory controller, cache, etc. A multi-core processor may be symmetric or asymmetric. The processor 620 can include multiple processors, such as a system having multiple, physically separate processors in different sockets, or a system having multiple processor cores on a single physical chip. Similarly, the processor 620 can include multiple distributed processors located in multiple separate computing devices, but working together such as via a communications network. Multiple processors or processor cores can share resources such as memory 630 or the cache 622, or can operate using independent resources. The processor 620 can include one or more of a state machine, an application specific integrated circuit (ASIC), or a programmable gate array (PGA) including a field PGA.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 660 can include software modules 662, 664, 666 for controlling the processor 620. The system 600 can include other hardware or software modules. The storage device 660 is connected to the system bus 610 by a drive interface. The drives and the associated computer-readable storage devices provide nonvolatile storage of computer-readable instructions, data structures, program modules and other data for the computing device 600. In one aspect, a hardware module that performs a particular function includes the software component stored in a tangible computer-readable storage device in connection with the necessary hardware components, such as the processor 620, bus 610, display 670, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 600 is a small, handheld computing device, a desktop computer, or a computer server. When the processor 620 executes instructions to perform "operations", the processor 620 can perform the operations directly and/or facilitate, direct, or cooperate with another device or component to perform the operations.

Although the exemplary embodiment(s) described herein employs the hard disk 660, other types of computer-readable storage devices which can store data that are accessible by a computer, such as magnetic cassettes, flash memory cards, digital versatile disks (DVDs), cartridges, random access memories (RAMs) 650, read only memory (ROM) 640, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations described below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited tangible computer-readable storage devices. Such logical operations can be implemented as modules configured to control the processor 620 to perform particular functions according to the programming of the module. For example, FIG. 6 illustrates three modules Mod1 662, Mod2 664 and Mod3 666 which are modules configured to control the processor 620. These modules may be stored on the storage device 660 and loaded into RAM 650 or memory 630 at runtime or may be stored in other computer-readable memory locations.

One or more parts of the example computing device 600, up to and including the entire computing device 600, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 620 can include all types of processors disclosed herein, including a virtual processor. However, when referring to a virtual processor, the processor 620 includes the software components associated with executing the virtual processor in a virtualization layer and underlying hardware necessary to execute the virtualization layer. The system 600 can include a physical or virtual processor 620 that receive instructions stored in a computer-readable storage device, which cause the processor 620 to perform certain operations. When referring to a virtual processor 620, the system also includes the underlying physical hardware executing the virtual processor 620.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method for executing a first user interface on a first device of a first type and a second user interface on a second device of a second type, wherein the first user interface is independent of the second user interface, the method comprising:
   communicatively coupling the first device to the second device;
   receiving, at the second user interface from an application designed for and executing on the first user interface, a root content item of a hierarchy of content items, wherein each content item in the hierarchy of content items has associated set of properties;
   retrieving, from the application, a set of properties for the root content item;
   based on the set of properties for the root content item, presenting at least part of the hierarchy of content items in an interactive hierarchical view on the second user interface that is independent of the first user interface, wherein the application has limited control over the second user interface;
   based on user interaction with the second user interface, accessing an indicated portion of the hierarchy of content items from the application; and
   dynamically updating, on the second user interface, the hierarchy of content items from the application based on the indicated portion and when a type of the hierarchy of content items presents changes.

2. The method of claim 1, wherein accessing the indicated portion comprises retrieving a content item for playback.

3. The method of claim 1, wherein the first device type is a mobile device, and wherein the second device type is an in-vehicle display.

4. The method of claim 1, wherein the set of properties comprises at least one of a title, a subtitle, an author, an artist, artwork, playback progress, whether a content item is a container, or whether the content item is playable.

5. The method of claim 1, wherein user interaction with the second user interface provides random access to the hierarchy of content items.

6. A device comprising:
   at least one processor; and
   at least one computer-readable memory device storing instructions which, when executed by the at least one processor, cause the at least one processor to:
      execute a second user interface independent from a first user interface of another device of a different type;
      communicatively couple with the another device;
      receive, from an application designed for the first user interface, a content item;

determine, based on the content item, a hierarchy of content items and a root content item for the hierarchy of content items, wherein each content item in the hierarchy of content items has associated set of properties;
retrieve from the application a set of properties for the root content item;
based on the set of properties for the root content item, present at least part of the hierarchy of content items in an interactive hierarchical view on the second user interface, wherein the application has limited control over the second user interface;
based on user interaction with the second user interface, access an indicated portion of the hierarchy of content items from the application; and
dynamically update the hierarchy of content items from the application based on the indicated portion and when a type of the hierarchy of content items presents changes.

7. The device of claim 6, wherein user interaction with the second user interface provides random access for playback of a content item.

8. The device of claim 6, wherein at least part of the hierarchy of content items not known but available upon request.

9. The device of claim 8, wherein accessing the indicated portion of the hierarchy of content items further comprises retrieving the indicated portion from a remote server.

10. The device of claim 6, wherein the second user interface provides a uniform graphical front-end for any hierarchy of content items independent of the application.

11. At least one non-transitory computer-readable storage device having stored therein instructions which, when executed by a processing device, cause the processing device to:
receive, from an application intended to execute on a first device type having a first user interface at a second device of a second type, a hierarchy of content items, wherein each content item in the hierarchy of content items has associated set of properties, and wherein the hierarchy of content items designates a root content item;
retrieve from the application, properties of at least a portion of content items in the hierarchy;
based on the properties, present at least part of the hierarchy of content items in an interactive hierarchical view on the second user interface that is independent of the first user interface and independent of an application-specific user interface of the application, wherein the application has limited control over the second user interface;
based on user interaction with the second user interface, access an indicated portion of the hierarchy of content items from the application; and
dynamically present the indicated portion on the second user interface based on the indicated portion and when a type of the hierarchy of content items presents changes.

12. The at least one non-transitory computer-readable storage device of claim 11, wherein the application is a third-party application, and wherein the root content item and the hierarchy of content items are accessible via an application programming interface.

13. The at least one non-transitory computer-readable storage device of claim 12, wherein the application is running on a first device of the first device type and communicates with a second device of the second device type via the application programming interface.

14. The at least one non-transitory computer-readable storage device of claim 11, wherein the application is assigned a unique application identifier.

15. The at least one non-transitory computer-readable storage device of claim 14, wherein each content item in the hierarchy is assigned a unique content item identifier.

16. The at least one non-transitory computer-readable storage device of claim 15, wherein content items in the hierarchy are indexed based on the unique application identifier and the unique content item identifier.

17. A system comprising:
at least one processor; and
at least one memory device storing instructions which, when executed by the at least one processor, cause the processor to:
receive, from an application designed for a first user interface of a first device type, a root content item of a hierarchy of content items, wherein each content item in the hierarchy of content items has associated set of properties;
retrieve from the application a set of properties for the root content item;
based on the set of properties for the root content item, present at least part of the hierarchy of content items in an interactive hierarchical view on a second user interface of a second device type that is independent of the first user interface of the first device type, wherein the application has limited control over the second user interface; and
based on user interaction with the second user interface, access an indicated portion of the hierarchy of content items from the application; and
dynamically update the hierarchy of content items from the application based on the indicated portion and when a type of the hierarchy of content items presents changes.

18. The system of claim 17, wherein the hierarchy of content items as received only includes the root content item.

19. The system of claim 17, comprising further instructions, when executed by the at least one processor, causing the at least one processor to:
retrieve, based on the root content item, at least one additional content item in the hierarchy; and
update the second user interface based on the at least one additional content item.

20. The system of claim 17, wherein the first device type comprises a mobile device and the second device type comprises a remote display of an on-board computer of a vehicle, the mobile device being linked with the remote display of the on-board computing device of the vehicle, such that the mobile device controls the remote display.

21. The at least one non-transitory of claim 11, wherein the first device type comprises a mobile device and the second device type comprises a remote display of an on-board computer of a vehicle, the mobile device being linked with the remote display of the on-board computing device of the vehicle, such that the mobile device controls the remote display.

* * * * *